(12) United States Patent
Graeber et al.

(10) Patent No.: US 7,570,013 B2
(45) Date of Patent: Aug. 4, 2009

(54) RECHARGEABLE BATTERY PACK, IN PARTICULAR FOR USE WITH ELECTRICAL HAND TOOL DEVICES, CHARGING DEVICE, AND RECHARGEABLE BATTERY PACK AND CHARGING DEVICE SYSTEM

(75) Inventors: Jochen Graeber, Bissingen (DE); Georg Breuch, Greven (DE)

(73) Assignees: Metabowerke GmbH, Nuertingen (DE); Friwo-Geraetebau GmbH, Ostbevern (DE)

( * ) Notice: Subject to any disclaimer, the term of this patent is extended or adjusted under 35 U.S.C. 154(b) by 247 days.

(21) Appl. No.: 11/522,383

(22) Filed: Sep. 18, 2006

(65) Prior Publication Data
US 2007/0069686 A1  Mar. 29, 2007

(30) Foreign Application Priority Data
Sep. 23, 2005  (EP)  ................................. 05020733

(51) Int. Cl.
*H02J 7/00*  (2006.01)
(52) U.S. Cl. ...................................... 320/106; 320/114
(58) Field of Classification Search .................. 320/106
See application file for complete search history.

(56) References Cited

U.S. PATENT DOCUMENTS 5,256,882 A * 10/1993 Miyasaka .................... 250/551
6,225,783 B1 * 5/2001 Nagano et al. ............... 320/128
6,492,792 B1 * 12/2002 Johnson et al. .............. 320/136
6,625,477 B1 * 9/2003 Wakefield .................... 455/572
2002/0117975 A1 * 8/2002 Yang ........................... 315/291
2005/0020304 A1 * 1/2005 Shinzaki .................... 455/556.1

FOREIGN PATENT DOCUMENTS

EP            0 661 769       7/1995
EP            0 800 253       10/1997

* cited by examiner

*Primary Examiner*—Akm E Ullah
*Assistant Examiner*—Samuel Berhanu
(74) *Attorney, Agent, or Firm*—Paul Vincent

(57) ABSTRACT

A rechargeable battery pack (20), in particular, for use with electrical hand tool devices, comprises a first and a second charging connection (24, 26), and a third control connection (28), all three being connectable to a charging device (46) for producing a charging connection, and with a calculating means (30) which can be addressed via an interface circuit (32), wherein the interface circuit uses the third control connection (28). In order to prevent destruction of the rechargeable battery pack due to erroneous charging, a non-linear component (34) is disposed in the interface circuit (32) which, upon control of the interface circuit (32) by the charging device (46), can be distinguished from an NTC component, thereby permitting detection of the rechargeable battery type when the calculating means (30) provides no identification information in response to control by the charging device (46).

15 Claims, 2 Drawing Sheets

RECHARGEABLE BATTERY PACK, IN PARTICULAR FOR USE WITH ELECTRICAL HAND TOOL DEVICES, CHARGING DEVICE, AND RECHARGEABLE BATTERY PACK AND CHARGING DEVICE SYSTEM

This application claims Paris Convention priority of EP 05 020 733.1 filed Sep. 23, 2005 the complete disclosure of which is hereby incorporated by reference.

BACKGROUND OF THE INVENTION

The invention concerns a rechargeable battery pack, in particular for use in electrical hand-tool devices, comprising a first and a second charging connection and a third control connection, all three being connectable to a charging device to produce a charging connection, and comprising a calculating means responsive to an interface circuit, wherein the interface circuit utilizes the third control connection.

Conventional analog rechargeable battery packs have a temperature probe in the form of an NTC resistor. The NTC resistor is responsive to the charging device via a third control connection of the rechargeable battery pack. In this fashion, heating of the rechargeable battery pack during the charging process can be detected, and the charging current limited or the charging process terminated. Nickel cadmium cells or nickel metal hydride cells are e.g. used for the rechargeable battery packs.

In a further development of this prior art, digital rechargeable battery packs have been provided with a calculating means which is responsive via an interface circuit, with the third control connection of the rechargeable battery pack also being used in this case. A bidirectional communication is thereby established between the charging device and the rechargeable battery pack such that rechargeable battery pack parameters can be transferred to a charging device provided with corresponding intelligence in order to adjust the charging process exactly to the specific rechargeable battery type and its operating parameters. A calculating means as mentioned above denotes any microcontroller or ASIC (application specific integrated circuit) or any other, in particular, programmable calculating device, known per se, for providing a preferably bidirectional communication in order to retrieve information and transfer it to the charging device. In particular, the calculating means may itself be designed and suited to interact with the charging process, i.e. for control in the broadest-sense.

Commercial operation of these rechargeable battery packs is associated with considerable load on all components due to constant use as well as other influences such as mechanical or-temperature-related: effects- any one of which could cause the service life of the rechargeable battery pack, i.e. the maximum operating-time, to-be exhausted or cause data transfer, i.e. the intended transfer of information in order to identify the specific rechargeable battery type, to be temporarily or permanently impaired. Temporary impairment could e.g. occur when a computer fails to respond for no obvious reason and could be corrected by re-booting. In such a situation an "intelligent" charging device may fail to receive proper information for evaluation when the calculating means of the rechargeable battery pack is active and, in consequence thereof, the charging device could e.g. assume that a conventional analog rechargeable battery pack had been inserted into the charging recepticle of the charging device and a corresponding charging routine might be executed. This would have destructive consequences if a digital rechargeable battery pack, without overheating protection in the form of an NTC resistor as is common in analog rechargeable battery packs, were actually being charged. In this case, the rechargeable battery pack would certainly be destroyed in such a charging process, which entails 15 to 60 minutes at charging currents of between 1 and 5 amperes. The use of Lithium ion rechargeable cells thereby represents e.g. considerable danger to the user and also to the environment. This also applies, in principle, to rechargeable battery packs having nickel cadmium cells or nickel metal hydride cells.

It is the underlying purpose of the present invention to effectively address the above-mentioned problem by providing digital rechargeable battery packs comprising the conventional two charging connections as well as the third control connections in conventional analog rechargeable battery packs, such that both packs can be charged using the same charging devices, while reliably preventing a digital rechargeable battery pack, without simple temperature sensor, e.g. on the basis of an NTC resistor, from being erroneously identified as a conventional analog rechargeable battery pack, to therefore prevent destruction of the rechargeable battery pack due to an erroneously selected charging process.

SUMMARY OF THE INVENTION

This object is achieved with a rechargeable battery pack of the above-mentioned type in that a non-linear component is provided in the interface circuit which, upon control of the interface circuit by the charging device, can be distinguished from an analog, linear component (e.g. an NTC component), thereby permitting detection of the rechargeable battery type when the calculating means fails to provide identification information to the charging device.

While a conventional analog NTC component has a linear current voltage characteristic, the interface circuit in accordance with the invention contains at least one non-linear component, which can be easily identified by sequentially applying two current/voltage working points to the interface circuit of the rechargeable battery pack via a routine of the charging device, and detecting the value of the voltage or current via a detecting means in the charging device to thereby determine whether or not the rechargeable battery pack has an analog linear control component, in particular, an NTC. When no information permitting identification of the digital rechargeable battery pack by the charging device is exchanged during response of the calculating means of the rechargeable battery pack in consequence of disturbance or failure, one can nevertheless detect whether or not a conventional analog rechargeable battery is in place by checking the interface circuit for the presence or absence of the non-linear component, in particular, as described above. If this test rules out the presence of an analog rechargeable battery, the charging process is advantageously not started or not continued in order to avoid the above-described consequences.

In accordance with a first embodiment of the invention, the non-linear component has one diode. In a further embodiment thereof, two diodes may be connected in series to enhance the non-linearity. It is thereby advantageous for the non-linear component to comprise a transmitting diode and a transistor, which form an optocoupler. The non-linear component can thereby be utilized to detect the rechargeable battery type when the intended communication with the rechargeable battery pack is not established, and at the same time be used for communication with the calculating means of the rechargeable battery pack. This communication via the same control connection of the rechargeable battery pack could also be realized by providing a communication line to the calculating means in the interface circuit, such that communication must not only transpire directly via the non-linear component.

In accordance with a further inventive idea, the interface circuit is designed to comprise a network with at least two parallel arms, wherein one arm is provided for a response from the calculating means via the charging device and the other arm for transferring information from the calculating means to the charging device.

In a further development of this idea, a further parallel arm advantageously forms an overload protection with, in particular, a Zener diode.

In another advantageous fashion, the calculating means of the rechargeable battery pack does not operate only as information-carrying storage means which is responsive and can be read out externally, but is designed to perform control functions itself. A temperature probe is thereby advantageously provided within the rechargeable battery pack, wherein the calculating means cooperates with the temperature probe, i.e. evaluates signals therefrom to detect a critical state of the rechargeable battery pack.

In another advantageous fashion, a voltage sensor is provided inside the rechargeable battery pack, to determine the cell voltage of the rechargeable battery pack, wherein the calculating means cooperates with this voltage sensor to also detect a critical state. It can thereby be detected e.g. whether and when the rechargeable cells have been sufficiently charged, which is then recognized as a critical state, and the actual charging process can be interrupted by the calculating means.

A switching means controlled by the calculating means is thereby advantageously provided which promptly interrupts the charging process by disconnecting the rechargeable battery cells from one of the charging connections. Suitable charging means may advantageously be used, preferably one and, in particular two MOSFETs.

Other objects of the invention concerns a charging device and a system consisting of a rechargeable battery pack of the inventive type and a charging device for the rechargeable battery pack.

In accordance therewith, a processor-operated charging device control is designed to apply two working points of a current/voltage characteristic to the interface circuit of the rechargeable battery pack, to detect the established value of the voltage or current via a detecting means, and to thereby determine whether or not the rechargeable battery pack has an analog linear control component (NTC).

In accordance with, the invention, the charging device detects voltage values or current values at two working points in the current/voltage diagram, thereby checking whether a linear control component, in particular, an NTC or a non-linear component is provided. In the latter case, one can be sure that the inserted rechargeable battery pack is not a conventional analog rechargeable battery pack having a conventional temperature sensor in the form of an NTC. As previously mentioned, the corresponding test routine is, in principle, only required when response by the calculating means of the rechargeable battery pack via the interface circuit has failed to produce unambiguous identification of the rechargeable battery pack through proper exchange of digitized information. The test routine must be activated only when such a bidirectional communication does not take place or does not produce proper identification of the rechargeable battery type.

Advantageously, the charging device of the system in accordance with the invention is designed to stop or interrupt the charging process when a non-linear characteristic has been detected in the voltage or current. In this case, the stoppage is advantageously signalled as a disturbance via corresponding display or display means such that the user can recognize that operation is disturbed and that this rechargeable battery pack cannot be recharged or at least not in this state, and should be replaced. The display means is preferably acoustic or acoustically supported, such that the user, in particular, during assembly operation is immediately informed of the disturbance, even when the charging device is not being directly observed during insertion of-the, rechargeable battery pack and afterwards.

The invention also concerns a method for operating a charging device with an associated rechargeable battery pack according to one or more of the claims 1 through 10, the method comprising the features of claim 15.

Further features, details and advantages of the invention can be extracted from the accompanying claims and the drawing and the following description of a preferred embodiment of the inventive rechargeable battery pack and the inventive charging device.

DESCRIPTION OF THE PREFERRED EMBODIMENT

Figure 1:
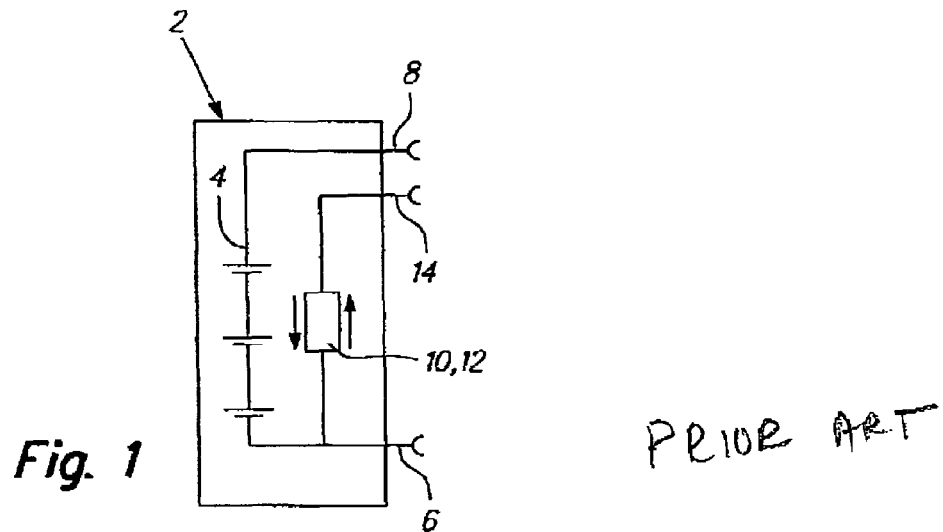
FIG. 1 shows a schematic view of a conventional rechargeable battery pack comprising a temperature probe for controlling the charging process.

FIG. 1 schematically shows a conventional rechargeable battery pack 2 comprising a number of rechargeable battery cells 4 which can be recharged via a first and a second charging connection 6, 8 using a charging device (not shown). It also shows a temperature probe 10 in the form of an NTC resistor 12 which is connected between a (third) control connection 14 and the first charging connection 6. A rise in temperature during charging of the rechargeable battery pack can be detected in the charging device (not shown), and corresponding control processes may be triggered to prevent overheating of the rechargeable battery pack in a conventional fashion.

Figure 2:
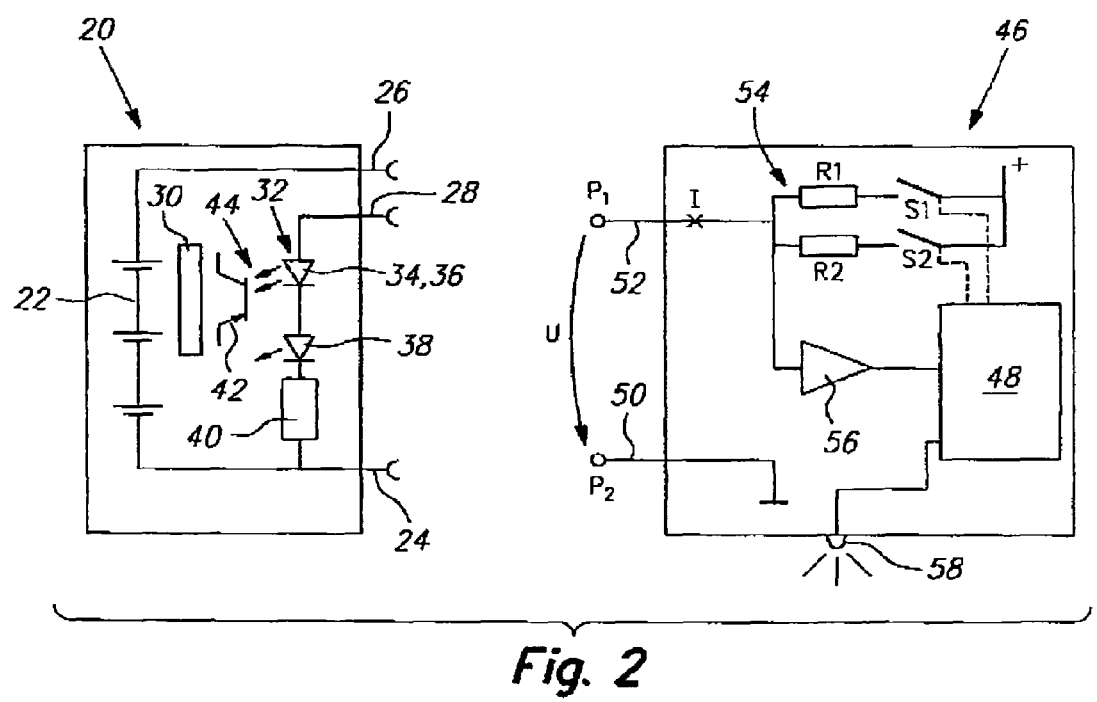
FIG. 2 shows a schematic view of an inventive rechargeable battery pack comprising an interface circuit (schematically shown) and an inventive charging device.

FIG. 2 shows, in a highly schematized fashion, an inventive rechargeable battery pack 20 comprising rechargeable battery cells 22 and charging connections 24, 26 as well as a (third) control connection 28. The inventive rechargeable battery pack 20 also comprises a calculating means 30, e.g. a microcontroller and an interface circuit 32, for external access to the calculating means 30. The interface circuit 32 utilizes the control connection 28 and the first charging connection 24. The interface circuit 32 schematically shown in FIG. 2 comprises a non-linear component 34 in the form of a transmitting diode 36. A further diode 38 is connected in series with the transmitting diode 36, in order to increase the non-linearity of the transmitting diode 36. A resistor 40 delimits the current.

The transmitting diode 36 cooperates with a schematically represented transistor 42 to form an optocoupler 44. The optocoupler 44 addresses the calculating means 30, as is explained below.

The interface circuit 32 permits bidirectional communication with the calculating means 30 (described below), and identification of the rechargeable battery type. by the charging device if the bidirectional communication with the calculating means, i.e. identification of the rechargeable battery type is not possible through reading-out of the information stored in the calculating means. Towards this end, the right-hand side of FIG. 2 shows a part of a schematically indicated charging-device 46. The charging device 46 has a processor-operated control device 48. For connecting to the rechargeable battery pack, the charging device 46 has a first charging connection 50 which can be connected to the first charging connection 24 of the rechargeable battery pack, and a control connection 52 which can be connected to the control connection 28 of the rechargeable battery pack (a second charging connection of the charging device 46, which can be connected to the second charging connection 26 of the rechargeable battery pack 20 is not shown in FIG. 2).

Figure 3:
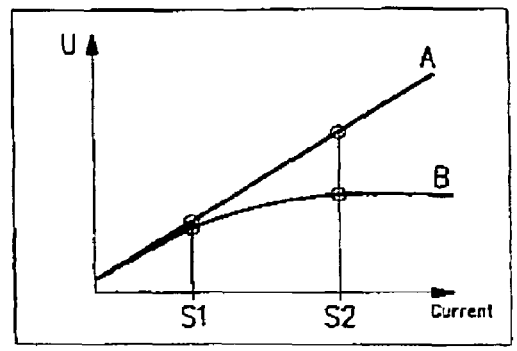
FIG. 3 shows a current/voltage characteristic of a linear and non-linear electrical component.

A first working point of a current/voltage characteristic can be applied to the interface circuit 32 via a circuit arrangement 54 through a first switch Si and a first resistor R1. Alternatively, a second working point of the current/voltage characteristic can be applied to the interface circuit 32 via a second switch S2 and a second resistor R2 (schematically shown in FIG. 3). The respectively resulting values of the voltage or current are determined via a corresponding detecting means 56 in the charging device 46 and evaluated in the control device 48. In this evaluation, it is checked and detected whether a linear or a non-linear current/voltage characteristic is present in the interface circuit 32. In the event that, after connecting the connections of the rechargeable battery pack 20 to the charging device 46, corresponding demands by the processor-operated control device 48 of the charging device 46 produce no information from the rechargeable battery pack via the interface circuit 32, the two working points are applied to the interface circuit by successively closing the switches S1 and S2, as described above, and the corresponding values of the voltage or current (depending on whether a constant current or a constant voltage is applied through the control circuit 54) are checked to determine whether a linear or a non-linear current/voltage characteristic is present. When a linear characteristic is detected, one can assume that the inserted rechargeable battery pack is one with a temperature probe 10 in the form of an NTC resistor, and a corresponding charging process which is suited for this rechargeable battery pack, i.e. a suitable charging process with high currents, can be started until the resistance of the NTC changes in the conventional fashion. When it is determined, however, that a non-linear voltage characteristic is present, one can be sure that the inserted rechargeable battery is not a conventional battery with an NTC resistance temperature probe. In this case, the charging process is interrupted or stopped, and an error message is issued via suitable display means 58, which may e.g. be visual display means, e.g. light emitting diodes, be acoustic, or acoustically supported display means.

In this fashion, a temporarily non-working digital rechargeable battery pack without conventional temperature probe in the form of an NTC resistor can be reliably prevented from being erroneously regarded as such a rechargeable battery pack, and from being charged in a charging process which is not suited for the rechargeable battery pack, which would certainly destroy it and equally represent a danger to the user and the environment.

Figure 4:
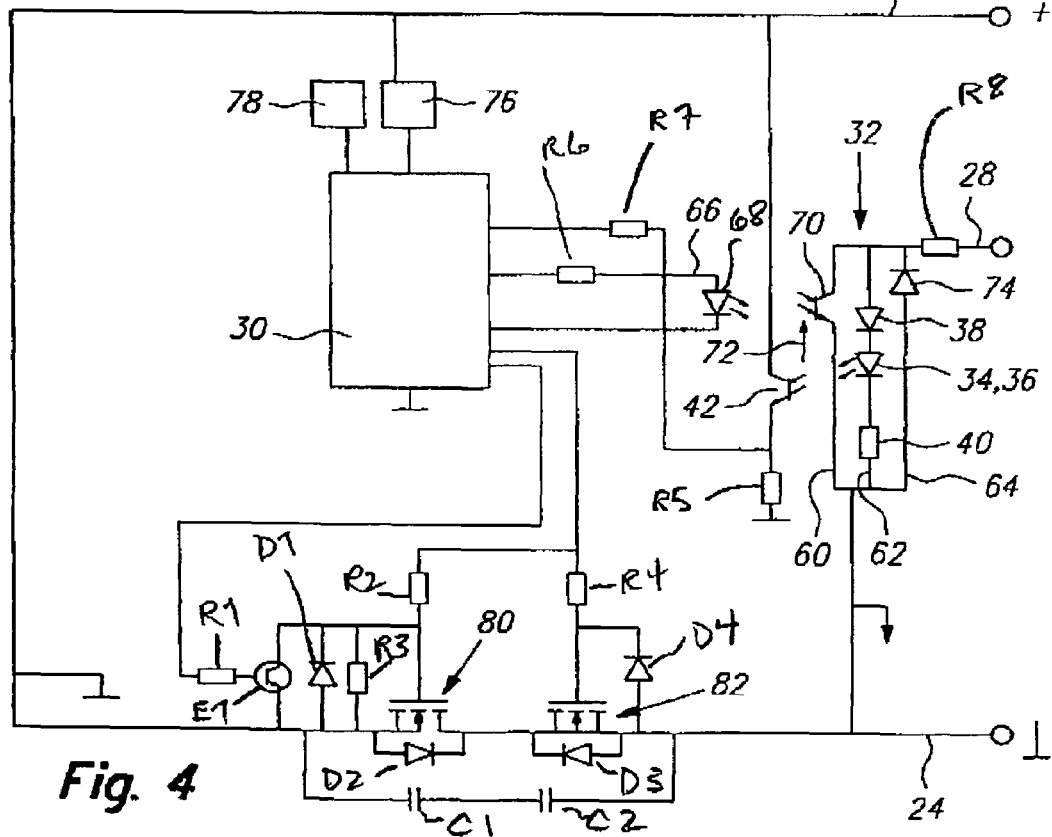
FIG. 4 shows a circuit diagram of an inventive rechargeable battery pack.

FIG. 4 shows a somewhat detailed but still schematic view of the circuit diagram of the inventive rechargeable battery pack 20. In particular, the interface circuit 32 is shown in detail. It comprises a network of three parallel arms 60, 62 and 64. The central arm 62 comprises the non-linear component 34 in the form of the transmitting diode 36, the further diode 38 and the resistor 40. As mentioned above, the transmitting diode 36 cooperates with the transistor 42, and the optocoupler formed thereby addresses the calculating means 30 (microcontroller) of the rechargeable battery pack. 20 to request information stored therein, in particular, about the rechargeable battery type (information request). The information is transmitted from the calculating means 30 to the charging device via a circuit part 66 coming from the calculating means having a transmitting diode 68 disposed therein, and a transistor 70 cooperating therewith, in the arm 60 of the interface circuit 32 (left hand side in FIG. 4). The transmitting diode 68 and transistor 70 form a further optocoupler 72 for transmitting information from the calculating means 30 via the interface circuit 32 to the charging device 46 or its control device 48.

A Zener diode 74 is provided in the protective circuit of arm 64 of the interface circuit 32 (right hand side of FIG. 4).

The calculating means 30 of the rechargeable battery pack 20 not only serves to read-out information upon request, but is also designed to control the charging process. It cooperates with a voltage sensor 76 for determining the cell voltage of the rechargeable battery pack to detect a critical state of the rechargeable battery cells 22. It also cooperates with a temperature sensor 78 to also detect a critical state of the rechargeable battery cells 22 or the rechargeable battery pack. When critical states are detected, the calculating means 30 acts on the charging process as a control device therefor and interrupts the charging process e.g. via suitable switching means 80, 82 which may be MOSFETs. The response of the calculating means 30 via the interface circuit 32 is also possible when the switching means 80, 82 are open.

FIG. 4 also shows a plurality of resistor elements R1 through R8, diodes D1 through D4, capacitors C1 and C2 as well as active element E1.

The inventive rechargeable battery pack and the inventive design of the charging device reliably prevent a rechargeable battery pack from being erroneously regarded as a conventional analog rechargeable battery pack with temperature probe (NTC element) and being destroyed during the charging process.

We claim:

1. A rechargeable battery pack for use in an electrical hand tool device, the battery pack structured for recharge using a charging device, the battery pack comprising:
   a charging terminal having a first and a second charging connection for connection to the charging device;
   a control connection for connection to the charging device;
   a calculating means;
   an interface circuit having a first branch connected between said control connection and said first charging connection for communication from the charging device to said calculating means and a second branch connected between said control connection and said first charging connection, in parallel with said first branch, to transmit information from said calculating means to the charging device; and
   a non-linear component disposed in said interface circuit, said non-linear component, upon control of said interface circuit by the charging device, being distinguished from an analog linear component to identify a rechargeable battery type should said calculating means fail to provide identification information to the charging device.

2. The rechargeable battery pack of claim 1, wherein said non-linear component comprises a diode.

3. The rechargeable battery pack of claim 2, wherein said non-linear component comprises a transmitting diode structured, together with a transistor, to form an optocoupler.

4. The rechargeable battery pack of claim 2, wherein two diodes are connected in series to enhance non-linearity.

5. The rechargeable battery pack of claim 1, further comprising a temperature probe, wherein said calculating means cooperates with said temperature probe to detect a critical state.

6. The rechargeable battery pack of claim 1, further comprising a voltage sensor to determine a cell voltage of the rechargeable battery pack, wherein said calculating means cooperates with said voltage sensor to detect a critical state.

7. The rechargeable battery pack of claim 1, further comprising a switching means controlled by said calculating means for stopping a charging process by interrupting a connection between rechargeable storage cells and said charging connections.

8. The rechargeable battery pack of claim 7, wherein said switching means comprises a MOSFET.

9. A charging device having a processor-operated control device for the rechargeable battery pack of claim 1, wherein the control device comprises:

means for applying two working points of a current/voltage characteristic to said interface circuit of the rechargeable battery pack;

means for detecting an established value of voltage or current; and means for determining whether or not the rechargeable battery pack has an analog linear control component.

10. The charging device of claim 9, further comprising means for interrupting or stopping a charging process when detection of voltage or current shows a non-linear characteristic.

11. The charging device of claim 10, further comprising a display means to indicate interruption or stoppage of the charging process as a disturbance of the charging device.

12. The charging device of claim 11, wherein the display means is acoustically or optically supported.

13. The charging device and rechargeable battery pack of claim 9.

14. A method for operating the charging device of claim 9, wherein the two working points of the current/voltage characteristic are applied consecutively to the interface circuit of the rechargeable battery pack and the value of the voltage or current established is detected via the detecting means to determine whether or not the rechargeable battery pack has an analog linear control component.

15. The method of claim 14, wherein an error message is issued and a charging process is discontinued.

* * * * *